(12) United States Patent
Burke et al.

(10) Patent No.: US 10,520,131 B2
(45) Date of Patent: Dec. 31, 2019

(54) POLE ARM SYSTEM WITH STACKABLE MOUNT CUP

(71) Applicant: Innovative Office Products, LLC, Easton, PA (US)

(72) Inventors: Timothy S. Burke, Manhasset, NY (US); Peter J. Carrasquillo, Columbia, MO (US); Stephen J. Bowman, Saylorsburg, PA (US); Michael P. Smith, Allentown, PA (US)

(73) Assignee: Innovative Office Products, LLC, Easton, PA (US)

( * ) Notice: Subject to any disclaimer, the term of this patent is extended or adjusted under 35 U.S.C. 154(b) by 20 days.

(21) Appl. No.: 15/720,683

(22) Filed: Sep. 29, 2017

(65) Prior Publication Data
US 2018/0094768 A1 Apr. 5, 2018

Related U.S. Application Data

(60) Provisional application No. 62/402,372, filed on Sep. 30, 2016.

(51) Int. Cl.
*F16M 11/10* (2006.01)
*F16M 11/18* (2006.01)
(Continued)

(52) U.S. Cl.
CPC ........... *F16M 11/18* (2013.01); *F16M 11/045* (2013.01); *F16M 11/10* (2013.01); *F16M 11/2014* (2013.01); *F16M 11/2092* (2013.01); *F16M 11/24* (2013.01); *F16M 11/26* (2013.01); *F16M 13/022* (2013.01); *A47B 2097/003* (2013.01); *A47B 2097/005* (2013.01);
(Continued)

(58) Field of Classification Search
USPC ....... 248/323, 325, 131, 133, 132, 917, 919, 248/922, 923; D14/375
See application file for complete search history.

(56) References Cited

U.S. PATENT DOCUMENTS 6,554,238 B1 * 4/2003 Hibberd ............... A47B 81/061
248/278.1
8,424,833 B2 * 4/2013 Muller ................... F16M 11/08
248/324
(Continued)

FOREIGN PATENT DOCUMENTS

WO 2006132938 A2 12/2006

OTHER PUBLICATIONS

Colebrook Bosson Saunders Flo Modular [online], [Retrieved Oct. 2, 2017], Retrieved from the internet: <https://www.colebrookbossonsaunders.com/monitor-arms/flo-modular/triple/>.
(Continued)

Primary Examiner — Alfred J Wujciak
(74) Attorney, Agent, or Firm — Design IP

(57) ABSTRACT

A pole arm system is disclosed which comprises a pole mount cup that may be reconfigured and stacked in different configurations so as to form different configurations of a pole mount assembly for supporting various arms and electronic devices. The pole mount assembly further comprises, in some embodiments, a pole collar assembly for engaging a dimpled pole in a fixed relationship. Multiple rotation stop mechanisms for use in joints of a pole arm system are also disclosed.

14 Claims, 13 Drawing Sheets

(51) Int. Cl.
*F16M 11/26* (2006.01)
*F16M 11/04* (2006.01)
*F16M 11/20* (2006.01)
*F16M 11/24* (2006.01)
*F16M 13/02* (2006.01)
*A47B 97/00* (2006.01)

(52) U.S. Cl.
CPC . *F16M 2200/024* (2013.01); *F16M 2200/028* (2013.01); *F16M 2200/048* (2013.01); *F16M 2200/063* (2013.01)

(56) References Cited

U.S. PATENT DOCUMENTS

| | | | | |
|---|---|---|---|---|
| 8,876,075 | B2* | 11/2014 | Diez | F16M 11/2014 248/274.1 |
| 9,022,339 | B2* | 5/2015 | Borg | H02G 3/0493 248/323 |
| 9,357,846 | B2 | 6/2016 | Hung | |
| 9,746,128 | B2* | 8/2017 | Huang | F16M 11/2014 |
| 10,066,785 | B1* | 9/2018 | Chen | F16M 13/022 |
| 2004/0195471 | A1 | 10/2004 | Sachen | |
| 2004/0251390 | A1* | 12/2004 | Wachob | F16M 11/10 248/323 |
| 2007/0080266 | A1* | 4/2007 | Oddsen, Jr. | A47B 49/00 248/125.7 |
| 2008/0117578 | A1 | 5/2008 | Moscovitch | |
| 2009/0134285 | A1* | 5/2009 | Huang | F16M 11/08 248/124.1 |
| 2013/0221174 | A1 | 8/2013 | Sapper et al. | |
| 2015/0342351 | A1* | 12/2015 | Hung | G06F 1/1601 211/26 |
| 2016/0245458 | A1 | 8/2016 | Hung | |

OTHER PUBLICATIONS

Humanscale Design Studio M/FLEX [online], [Retrieved on Oct. 2, 2017], Retrieved from the internet: <https://www.humanscale.com/products/product.cfm?group=mflex>.
The International Search Report and the Written Opinion of the International Searching Authority, dated Feb. 1, 2018, for International Application No. PCT/US2017/05449.

* cited by examiner

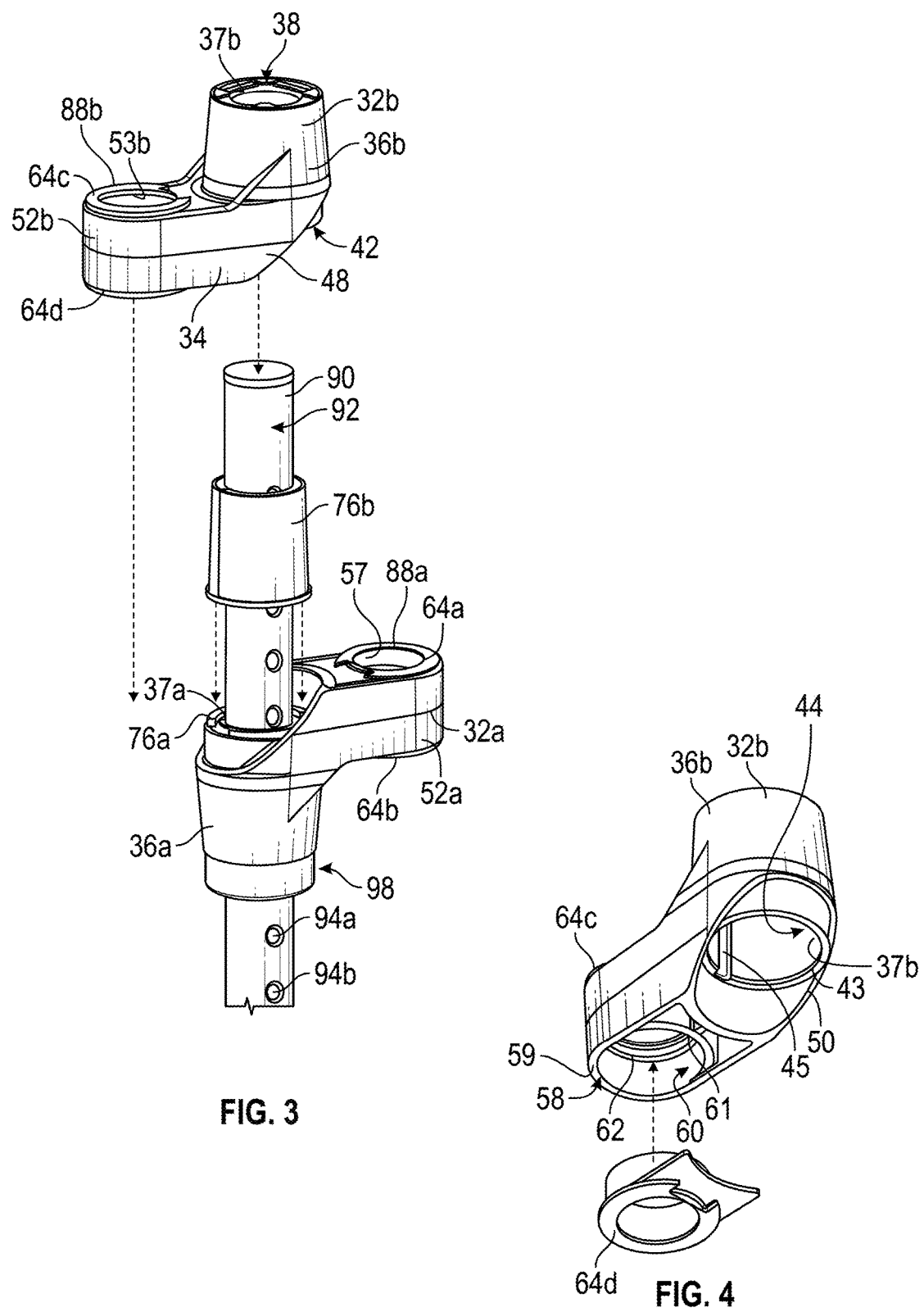

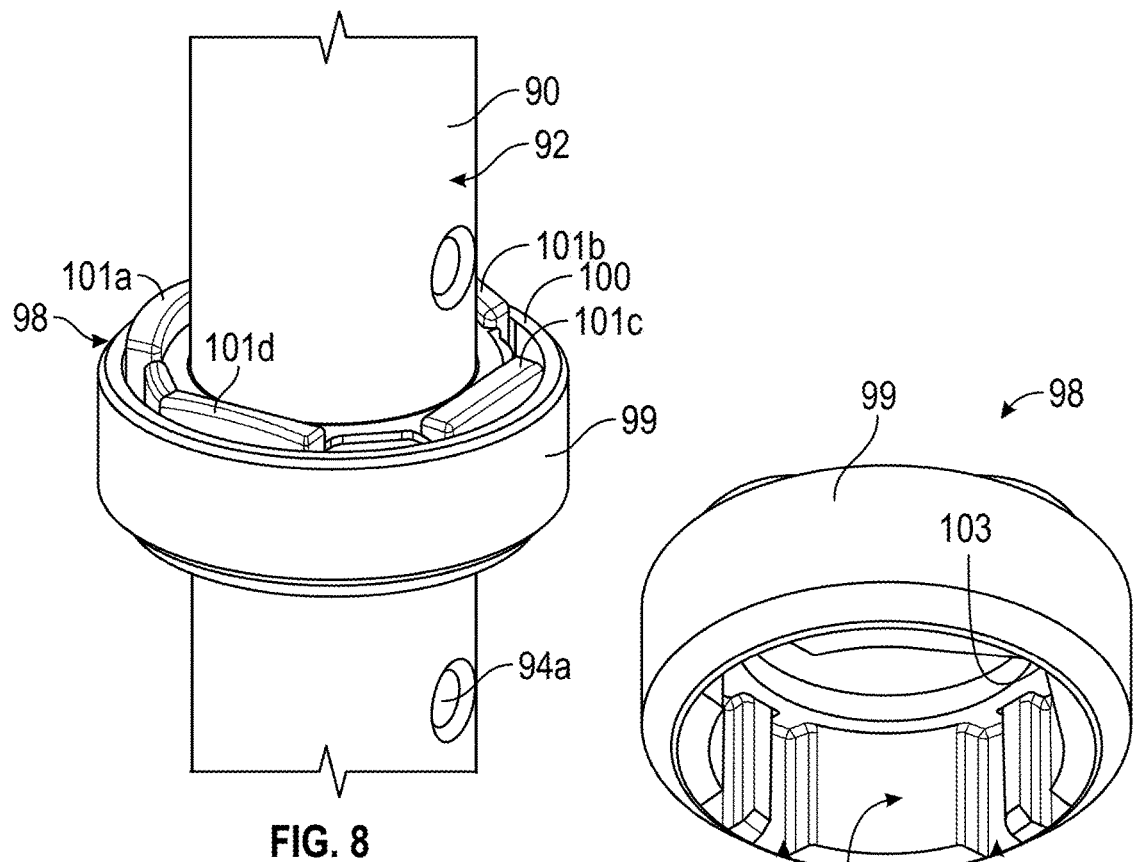
FIG. 8
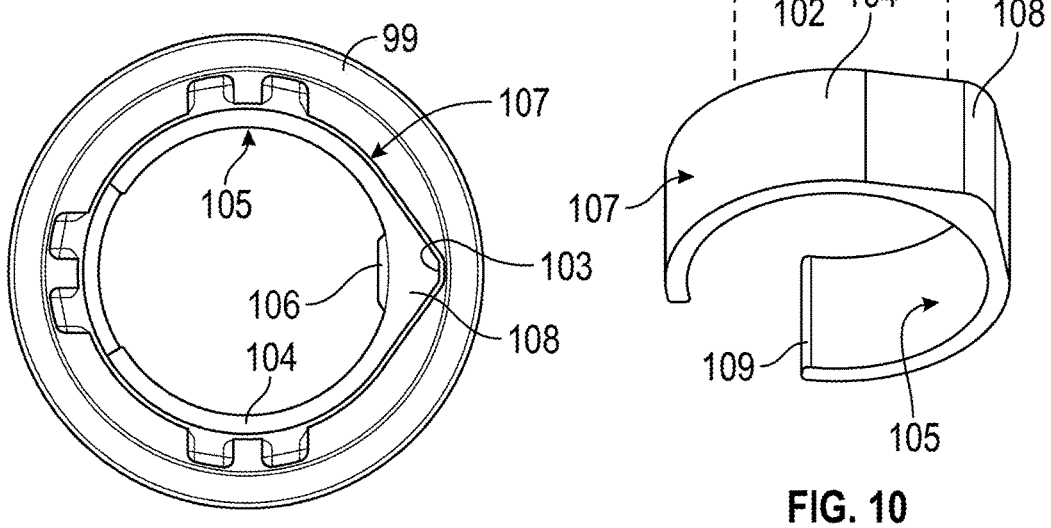
FIG. 9
FIG. 10

POLE ARM SYSTEM WITH STACKABLE MOUNT CUP

BACKGROUND OF THE INVENTION

The present invention relates to a pole arm system for supporting electronic user devices, for example computer monitors, and more particularly to a pole arm system having a collar system that is stackable and repositionable to form multiple configurations of the pole arm system.

Pole arm systems having a collar or clamp used to affix a monitor arm or monitor arm array to a pole are well known in the art. These collars and clamps are typically limited in their ability to be used for multiple configurations of a pole arm system, thus requiring part replacement and/or the use of multiple different parts to reconfigure a pole arm system for various users' needs. These systems also have collars or clamps that do not stack well together, and detract from the aesthetic appearance of the pole arm system.

Accordingly, there is a need for a pole arm system having improved configurability over known pole arm systems.

BRIEF DESCRIPTION OF THE DRAWINGS

The present invention will hereinafter be described in conjunction with the appended drawing figures, wherein like numerals denote like elements.

FIGS. 2 and 3 are partial exploded views of portions of the pole mount assembly thereof;

FIGS. 4 and 5 are partial exploded views of components of the pole mount assembly;

FIG. 8 is a perspective view of the pole collar assembly of the pole mount assembly, installed onto the pole;

FIG. 9 is a bottom view of the pole collar assembly;

FIG. 10 is an exploded view thereof;

DETAILED DESCRIPTION OF THE PREFERRED EMBODIMENTS

Figure 1:
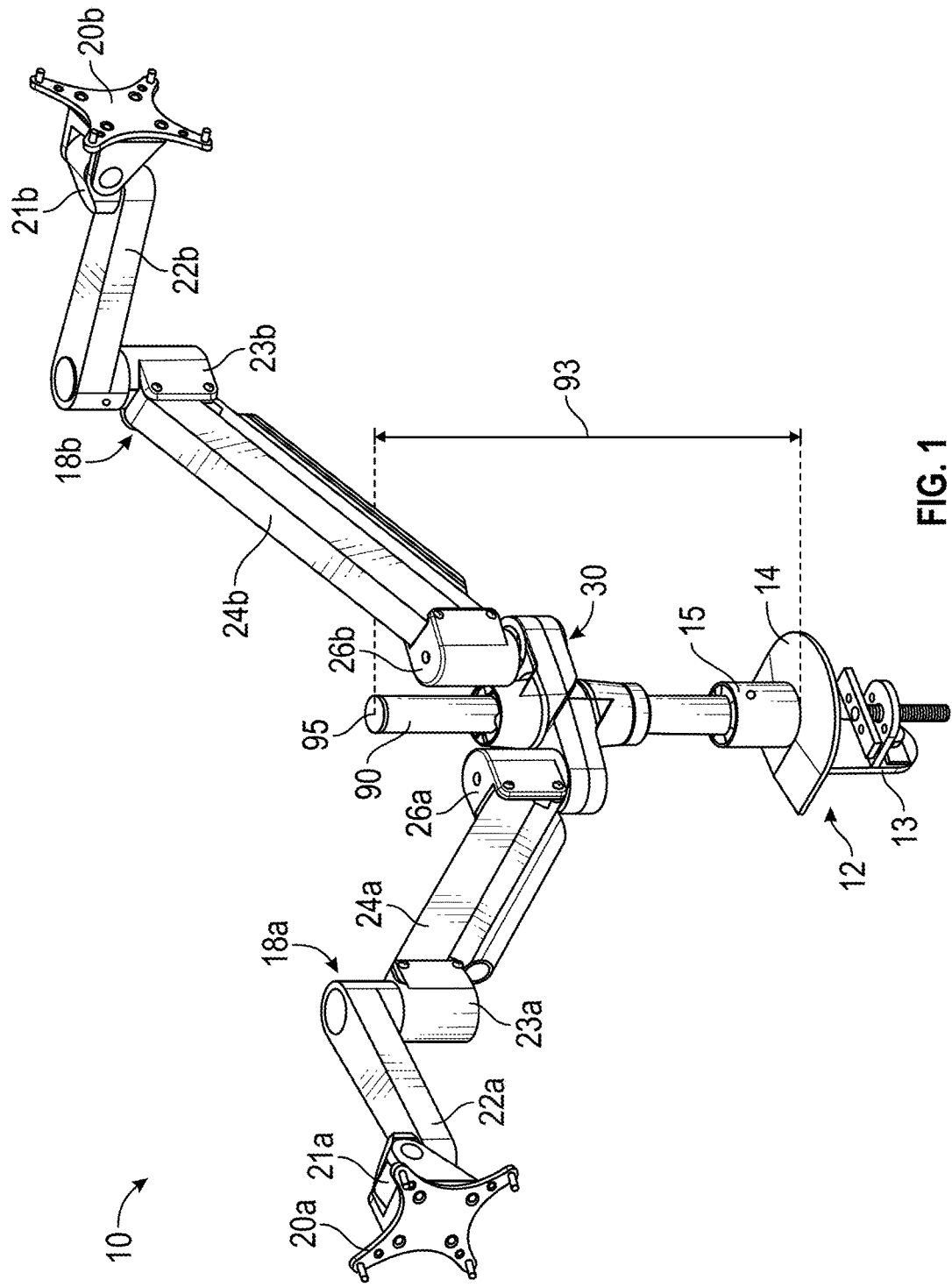
FIG. 1 is a front perspective view of a pole arm system in accordance with one embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Referring generally to FIGS. 1-11, one embodiment of a pole arm system 10 in accordance with the present invention is shown. In this embodiment, as shown in FIG. 1, the pole arm system 10 includes a base mount assembly 12 which is used to attach the pole arm system 10 to a support surface (not shown), such as a table, desk, or other generally-horizontal surface. As would be appreciated by a person having ordinary skill in the art, the base mount assembly 12 comprises a clamping assembly 13 for clamping around the edge of the support surface, a base plate 14 that would sit on top of the support surface, and a pole cup 15 that supports the bottom end of a pole 90 of the pole arm system 10. It should be understood that, in alternate embodiments according to the present invention, any suitable type of base mount assembly could be used, including but not limited to a bolt-through mount, rail mount, or slat wall mount.

In this embodiment, the pole arm system 10 includes a pair of arm assemblies 18a,18b. Arm assembly 18a comprises a display adapter plate 20a attached to a tilter assembly 21a. As would be appreciated by a person having ordinary skill in the art, in this embodiment a first electronic display (not shown) is attachable to the display adapter plate 20a via either the 75 mm or 100 mm square-pattern VESA mounting holes located in the display adapter plate 20a. The tilter assembly 21a provides for movement of the attached electronic display about a pair of orthogonal axes, one axis corresponding with a rotating cylinder of the tilter assembly 21a and the other axis corresponding with a vertical shaft that rotationally attaches the tilter assembly 21a to a forearm 22a. The forearm 22a is rotationally attached to a first endcap 23a of a channel assembly 24a, which in this embodiment is a four-bar linkage such as those known in the art. A second endcap 26a of the channel assembly 24a is rotationally attached to a coupling 88a of a pole mount assembly 30 of the pole arm system 10, as will be described below in detail.

Arm assembly 18b comprises a display adapter plate 20b attached to a tilter assembly 21b. As would be appreciated by a person having ordinary skill in the art, in this embodiment a second electronic display (not shown) is attachable to the display adapter plate 20b via either the 75 mm or 100 mm square-pattern VESA mounting holes located in the display adapter plate 20b. The tilter assembly 21b provides for movement of the attached electronic display about a pair of orthogonal axes, one axis corresponding with a rotating cylinder of the tilter assembly 21b and the other axis corresponding with a vertical shaft that rotationally attaches the tilter assembly 21b to a forearm 22b. The forearm 22b is rotationally attached to a first endcap 23b of a channel assembly 24b, which in this embodiment is a four-bar linkage such as those known in the art. A second endcap 26b of the channel assembly is rotationally attached to a coupling 88b of the pole mount assembly 30 of the pole arm system 10, as will be described below in detail.

It should be understood that, in alternate embodiments of the pole arm system 10 according to the present invention, the arm assembly 18a and/or arm assembly 18b could be replaced with any number of different components that are mountable to the couplings 88a,88b, including but not limited to non-articulable forearms or arm extensions, articulable arms, tilters, additional poles, or other known components of pole arm systems. In this embodiment, the pole 90 has an exterior surface 92, a length 93, and a pole cap 95 located on the top end thereof. In this embodiment, the pole cap 95 is for aesthetic purposes. In alternate embodiments, the pole cap 95 could be omitted entirely.

Figure 2:
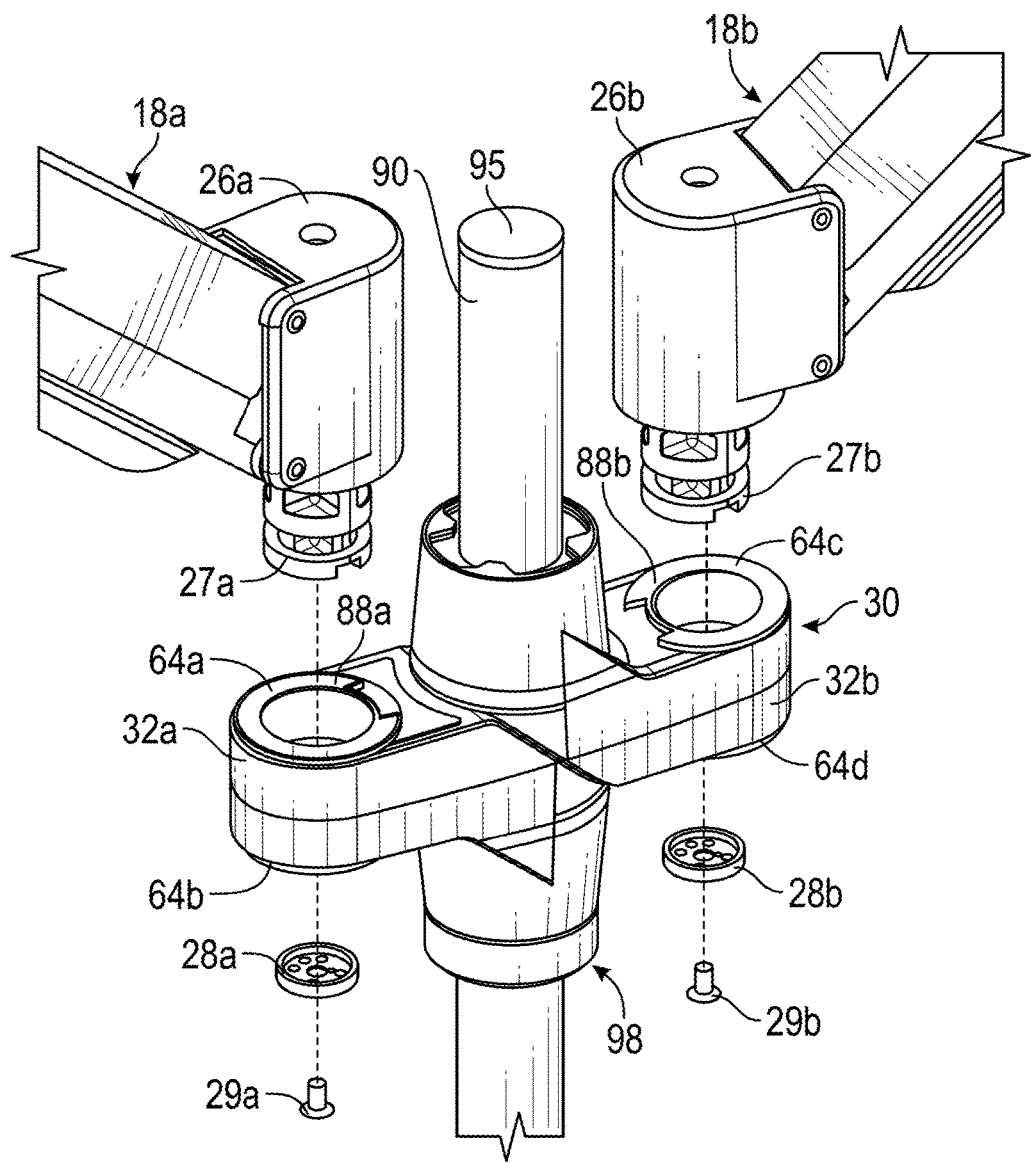
Figure 5:
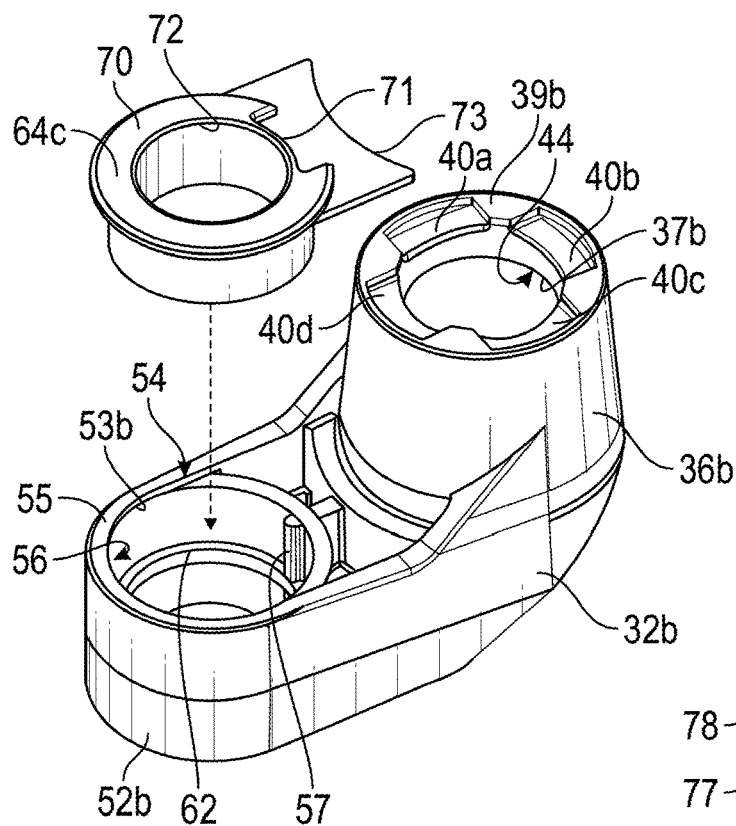

As shown in FIG. 2, the endcap 26a comprises a shaft 27a that is mounted through the coupling 88a and fixed thereto via a dog washer 28a and fastener 29a that is passed through the dog washer 28a and into a threaded passage (not shown) located in the bottom end of the shaft 27a, and the endcap 26b comprises a shaft 27b that is mounted through the coupling 88b and fixed thereto via a dog washer 28b and fastener 29b that is passed through the dog washer 28b and into a threaded passage (not shown) located in the bottom end of the shaft 27b. The interaction between the dog washers 28a,28b and the respective shaft 27a,27b ensures that the arm assemblies 18a,18b rotate in their entireties about the respective coupling 88a,88b. The structure and functionality of dog washer joints of this type is shown and described in greater detail in PCT International Application Publication No. WO 2015/085243, the contents of which are incorporated herein by reference as if set forth in their entirety.

Two alternate embodiments of joint mechanisms that interact with the shaft of an endcap as a dog washer and which also comprise respective rotation stop components are shown, respectively, in FIGS. 15-17 and FIGS. 18-19. These joint mechanisms will be described in detail below.

Referring back to FIG. 2, in this embodiment the pole mount assembly 30 comprises a pair of pole mount cups 32a,32b that are mated together and installed along the length 93 of the pole 90. The pole mount assembly 30 further comprises a pole collar assembly 98 which is used to maintain the pole mount assembly 30, the arm assemblies 18a,18b, and all attached user devices and components at a user-selected position along the length 93 of the pole 90. The pole collar assembly 98 will be discussed below in detail.

In this embodiment, the pole mount cup 32a has a body 34 that includes a pole mount portion 36a that is used to attach the pole mount cup 32a to the pole 90, a shaft mount portion 52a that is used, in the present embodiment, to attach the endcap 26a of the arm assembly 18a thereto, and a bend 48 that separates the pole mount portion 36a from the shaft mount portion 52a. In this embodiment, the pole mount portion 36a is in part vertically separated (i.e., located at a different height position) from the shaft mount portion 52a, when the pole mount cup 32a is installed onto the pole 90. In this embodiment, the pole mount cup 32b is identical to the pole mount cup 32a, and includes a pole mount portion 36b that is used to attach the pole mount cup 32b to the pole 90 and a shaft mount portion 52b that is used, in the present embodiment, to attach the endcap 26b of the arm assembly 18b thereto. In this embodiment, a pair of bushings 64a,64b are installed within the shaft mount portion 52a of the pole mount cup 32a to form the coupling 88a to which the endcap 26a of the arm assembly 18a is attached, and a pair of bushings 64c,64d are installed within the shaft mount portion 52b of the pole mount cup 32b to form the coupling 88b to which the endcap 26b of the arm assembly 18b is attached.

Because pole mount cup 32a and pole mount cup 32b are identical, it should be understood that the discussion herein with respect to the parts of either of the pole mount cups 32a,32b is equally applicable to the other pole mount cup 32a,32b, and/or any additional pole mount cup that may be used in the pole arm system 10. In should be understood that the discussions below with respect to FIGS. 3-5 refer interchangeably to both of pole mount cups 32a,32b.

Pole mount portion 36b of pole mount cup 32b comprises a first axial passage 37b having a first end 38, a second end 42, and an interior surface 44. The pole mount portion 36b comprises a first end face 39b and a second end face 43, which terminates within the perimeter of a mating edge 50 of the pole mount portion 36b that corresponds to the underside of the bend 48. Likewise, the pole mount portion 36a of the pole mount cup 32a comprises a first axial passage 37a. A slot 45 is located within the interior surface 44 of the first axial passage 37b of the pole mount portion 36b of the pole mount cup 32b, and acts to retain a bushing 76b in an indexed, non-rotational configuration with respect to the first axial passage 37b, as will be described below in greater detail. The slot 45 has a tapered width to ensure proper installation of the bushing 76b therein, as will be described below in detail.

FIG. 3 shows a partial exploded view of the pole mount assembly 30, with the pole mount cup 32b shown removed from the pole 90 and the bushing 76b shown lifted off of its mated position with an additional bushing 76a that has been installed within the pole mount portion 36a of pole mount cup 32a. It should be understood that the bushings 76a,76b are identical, and that any discussion herein with respect to bushing 76b is equally applicable to bushing 76a. When pole mount cup 32b is installed onto the pole 90, bushing 76b is installed within the first axial passage 37b thereof, and the bushings 76a,76b are mated together as will be described below in detail. In this way, the pole mount portions 36a,36b of the respective pole mount cups 32a,32b are fixed in a non-rotational position with respect to the pole 90.

Shaft mount portion 52b of pole mount cup 32b comprises a second axial passage 53b having a first end 54, a second end 58, an interior surface 56 located on a first side of a bushing seat 62 within the second axial passage 53b, and an interior surface 60 located on a second side of the bushing seat 62 within the second axial passage 53b. The shaft mount portion 52b comprises a first end face 55 and a second end face 59. Likewise, the shaft mount portion 52a of the pole mount cup 32a comprises a second axial passage 53a. Protrusions 57,61 are located within the respective interior surfaces 56,60 of the second axial passage 53b of the shaft mount portion 52b of the pole mount cup 32b on either side of the bushing seat 62, and act to retain a respective one of the bushings 64c,64d in indexed configurations with respect to the second axial passage 53b, as will be described below in greater detail. It should be understood that bushings 64a-64d are identical, and that any discussion herein with respect to any of bushings 64a-64d is equally applicable to the other of the bushings 64a-64d.

Figure 6:
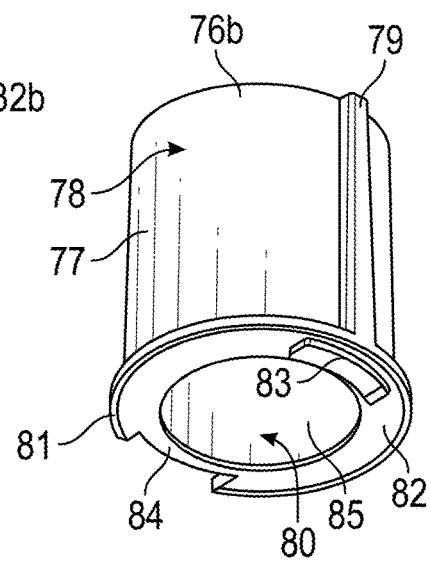
FIGS. 6 and 7 are perspective views of components of the pole mount assembly.
Figure 7:
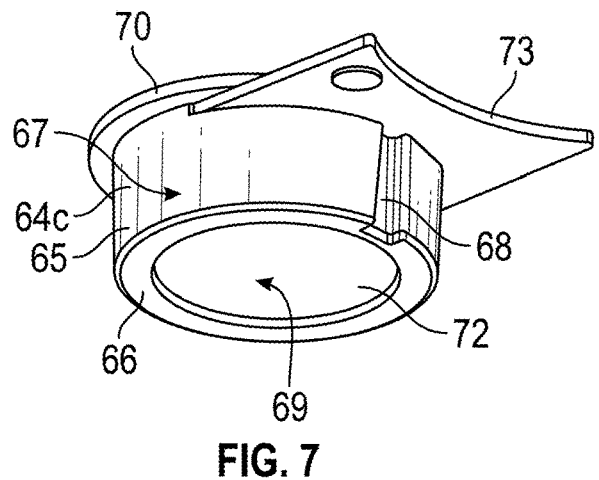

As shown in FIGS. 6 and 7, bushing 64c comprises a main body 65 having an interior surface 69, an exterior surface 67 that includes a slot 68, and an end face 66. The bushing 64c further comprises a flange 70 that includes an alignment slot 71 and a central opening 72 through which the pole 90 is inserted. When the bushing 64c is installed within the shaft mount portion 52b, the flange 70 rests against the first end face 55 of the shaft mount portion 52b, the end face 66 of the main body 65 of the bushing 64c rests against a respective side of the bushing seat 62 within the shaft mount portion 52b, and the slot 68 engages with the protrusion 57 within the interior surface 56 of the shaft mount portion 52b, thereby preventing rotation of the bushing 64c within the shaft mount portion 52b. The bushing 64c further comprises a casting extrusion cover 73 that, for aesthetic purposes, covers the hollow casting portions (not labeled) of the shaft mount portion 52b of the pole mount cup 32b once the bushing 64c is installed within the shaft mount portion 52b. Likewise, when the bushing 64d is installed within the shaft mount portion 52b, its slot (not labeled) engages with the protrusion 61 within the interior surface 60 of the shaft mount portion 52b, thereby preventing rotation of the bushing 64d within the shaft mount portion 52b.

Thus, coupling 88a is formed by inserting bushings 64a,64b within the second axial passage 53a of the shaft mount portion 52a of the pole mount cup 32a, and coupling 88b is formed by inserting bushings 64c,64d within the second axial passage 53b of the shaft mount portion 52b of the pole mount cup 32b. As discussed above, in this embodiment the couplings 88a,88b rotationally engage the respective second endcap 26a,26b of the respective channel assembly 24a,24b, although in alternate embodiments the couplings 88a,88b are adapted to support the shaft of any additional component of the pole arm system 10, for example but not limited to a non-articulable arm, an articulable arm, a tilter assembly, or a non-adjustable display adapter.

The first end face 39b of the pole mount portion 36b of the pole mount cup 32b comprises a plurality of slots 40a-40d that permit the pole mount cup 32b to be rotationally fixed with respect to additional components of the pole mount assembly 30, as will be described below in further detail.

Referring to FIG. 6, the bushing 76b comprises a main body 77 having an exterior surface 78 and an interior surface 80. The bushing 76b further comprises a central opening 85 through which the pole 90 is inserted. In this embodiment, the bushing 76b further comprises a flange 81 that includes a flange face 82, the flange face 82 having a tab 83 and a slot 84. In this embodiment, the tab 83 and slot 84 are complementary in shape and circumferentially-opposed along the flange face 82, thereby permitting pairs of bushings (e.g., bushings 76a,76b) to be mated together in a non-rotational relationship. The exterior surface 78 of the main body 77 further comprises a protrusion 79, which in this embodiment has a tapered width. In addition, in this embodiment, main body 77 of bushing 76b has a tapered width as measured between the flange 81 and the opposite end of the main body 77. The tapered width of the main body 77 of the bushing 76b ensures that the bushing 76b is installed properly within the pole mount portion 36b of pole mount cup 32b, and acts to maintain the bushing 76b within the pole mount portion 36b via frictional forces.

When the bushing 76b is installed within the pole mount portion 36b of the pole mount cup 32b, the flange 81 rests against the second end face 43 of the pole mount portion 36b, the exterior surface 78 of the main body 77 of the bushing 76b is placed in contact with the interior surface 44 of the pole mount portion 36b, and the protrusion 79 on the exterior surface 78 of the bushing 76b engages with the slot 45 within the interior surface 44 of the pole mount portion 36b, thereby preventing rotation of the bushing 76b within the pole mount portion 36b. As shown in FIG. 3 and noted above, in this embodiment, when the pole mount assembly 30 is assembled, the tab 83 of the bushing 76b engages with the slot (not labeled) of the bushing 76a and the slot 84 of the bushing 76b engages with the tab (not labeled) of the bushing 76a. Further, the pole mount cups 32a,32b are rotationally fixed with respect to their respective bushing 76a,76b due to the interactions between the complementary protrusions and slots.

In this embodiment, the bushings 64a-64d and bushings 76a,76b of the pole mount assembly 30 are comprised of any suitable non-metal material, for example nylon or any of a variety of suitable thermoplastics, and act to prevent contact between the metal surfaces of the pole 90, pole mount cups 32a,32b, and shafts 27a,27b of the endcaps 26a,26b. In alternate embodiments, the bushings could be comprised of a suitable metal material, for example bronze.

In this embodiment, when mated together as shown in FIGS. 1 and 2 with their respective pole mount portions 36a,36b installed around the pole 90, the pole mount cup 32a is in a vertically upright position and the pole mount cup 32b is in a vertically inverted position. In addition, the mating edges of the two pole mount cups 32a,32b are mated together at an oblique angle with respect to the length 93 of the pole 90, but the shaft mount portions 52a,52b and corresponding couplings 88a,88b are fixed at the same vertical height. In this embodiment, the mating edge 50 extends at a 45 degree angle with respect to the axes of the first axial passage 37b and second axial passage 53b. In alternate embodiments according to the present invention, the mating edge 50 of the pole mount cup 32a could extend at any non-45 degree angle.

FIGS. 8-11 disclose the features of the pole collar assembly 98. In this embodiment, the pole collar assembly 98 is comprised of a pole collar 99 and a pole clip 104 that nests within the pole collar 99. In this embodiment, the pole collar 99 comprises a top end face 100 and a plurality of protrusions 101a-101d located interior to the top end face 100. The pole collar 99 further comprises an interior surface 102 having a cutout 103 that acts to maintain the pole clip 104 in a fixed rotational relationship with respect to the pole collar 99. The pole clip 104 comprises an exterior surface 107 having a protrusion 108, an interior surface 105 comprising a stud 106, and a gap 109 that permits the pole clip 104 to be flexed open so as to be installed along or removed from the length 93 of the pole 90 without the need to remove the remaining parts of the pole mount assembly 30 from the pole 90. As shown in the bottom view of the pole collar assembly 98 of FIG. 9, the pole clip 104 is nested within the pole collar 99 so that the exterior surface 107 of the pole clip 104 is in contact with the interior surface 102 of the pole collar 99 and the protrusion 108 of the pole clip 104 is mated with the cutout 103 in the pole collar 99, which is complementary in shape, so as to prevent rotation between the pole collar 99 and pole clip 104.

Figure 11:
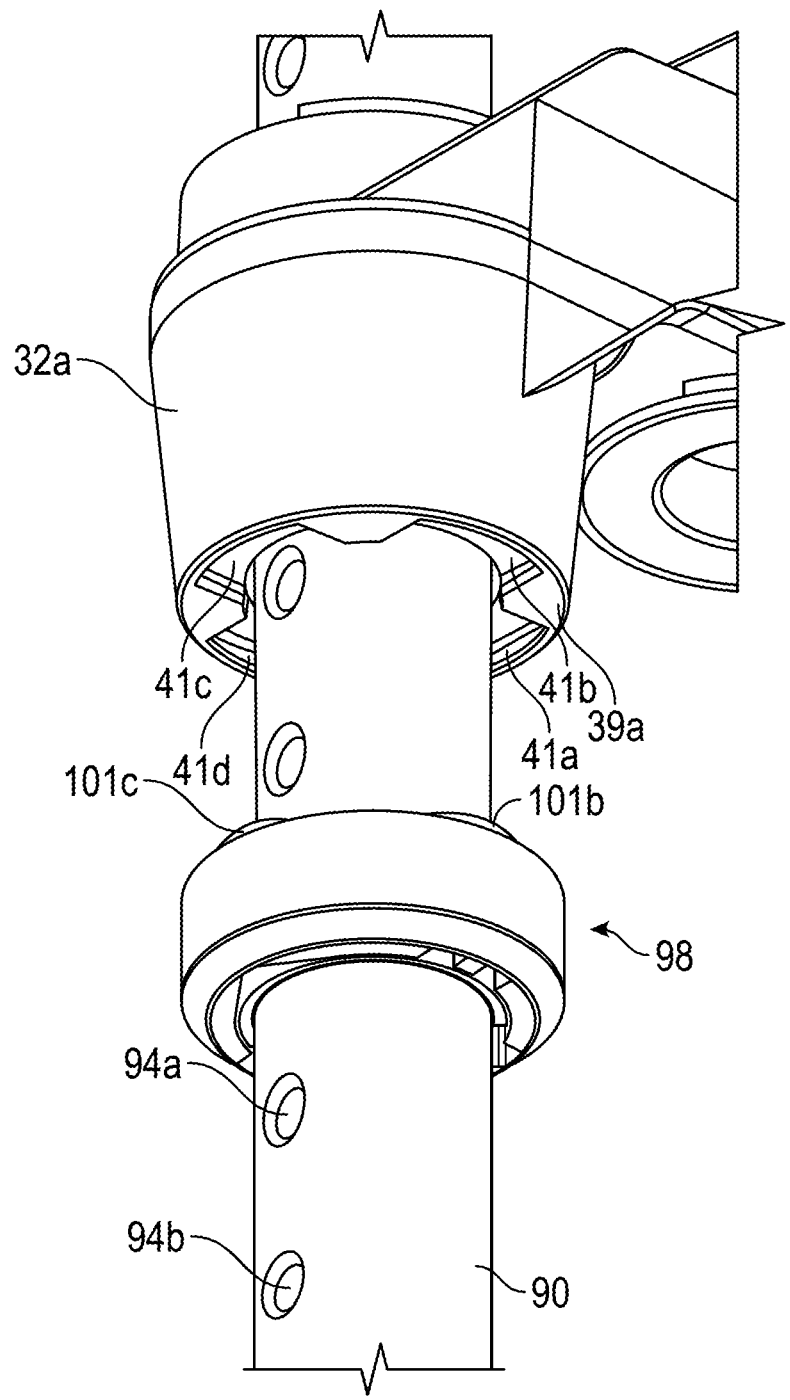
FIG. 11 is a partial exploded view of components of the pole mount assembly.

As seen in FIGS. 3, 8, and 11, in this embodiment the pole 90 has a plurality of dimples (only dimples 94a,94b are labeled) located along the length 93 thereof. The stud 106 on the interior surface 105 of the pole clip 104 has a shape that is complementary to the shape of the dimples 94a,94b and is adapted to engage one of the dimples 94a,94b at a time at a user-selected location along the length 93 of the pole. The engagement between the stud 106 and a user-selected dimple (e.g., dimples 94a,94b) along the length 93 of the pole 90 maintains the pole clip 104 in a fixed length position and rotational position on the pole 90. As discussed above, due to the interaction between the protrusion 108 of the pole clip 104 and the cutout 103 of the pole collar 99, which are complementary in shape, the pole collar assembly 98 is removably fixed into a user-desired location along the length 93 of the pole 90.

As shown in the partial exploded view of FIG. 11, in this embodiment the pole mount cup 32a is vertically flipped with respect to the pole mount cup 32b, such that the slots 41a-41d of the pole mount cup 32a are faced downwardly, towards the pole collar assembly 98. When the pole mount cup 32a is brought down into contact with the pole collar assembly 98, the top end face 100 of the pole collar 99 comes into contact with the first end face 39a of the pole mount cup 32a and the protrusions 101a-101d of the pole collar 99 fixedly engage the slots 41a-41d located in the pole mount cup 32a, which are complementary in shape. Thus, the pole mount cup 32a becomes positionally and rotationally fixed with respect to the pole collar assembly 98. Therefore, as discussed above in detail, because the pole mount cups 32a,32b and bushings 76a,76b are all rotationally locked together, the entire pole mount assembly 30 is thus positionally and rotationally fixed with respect to the length 93 of the pole 90.

While in this embodiment the pole collar assembly 98 engages the dimples in the pole in a non-rotational relationship, it should be understood that in alternate embodiments according to the present invention, the pole collar assembly could be attached to the pole via friction or through the use of clamping, which would permit a non-dimpled pole to be used as part of the present pole arm system 10.

Figure 12:
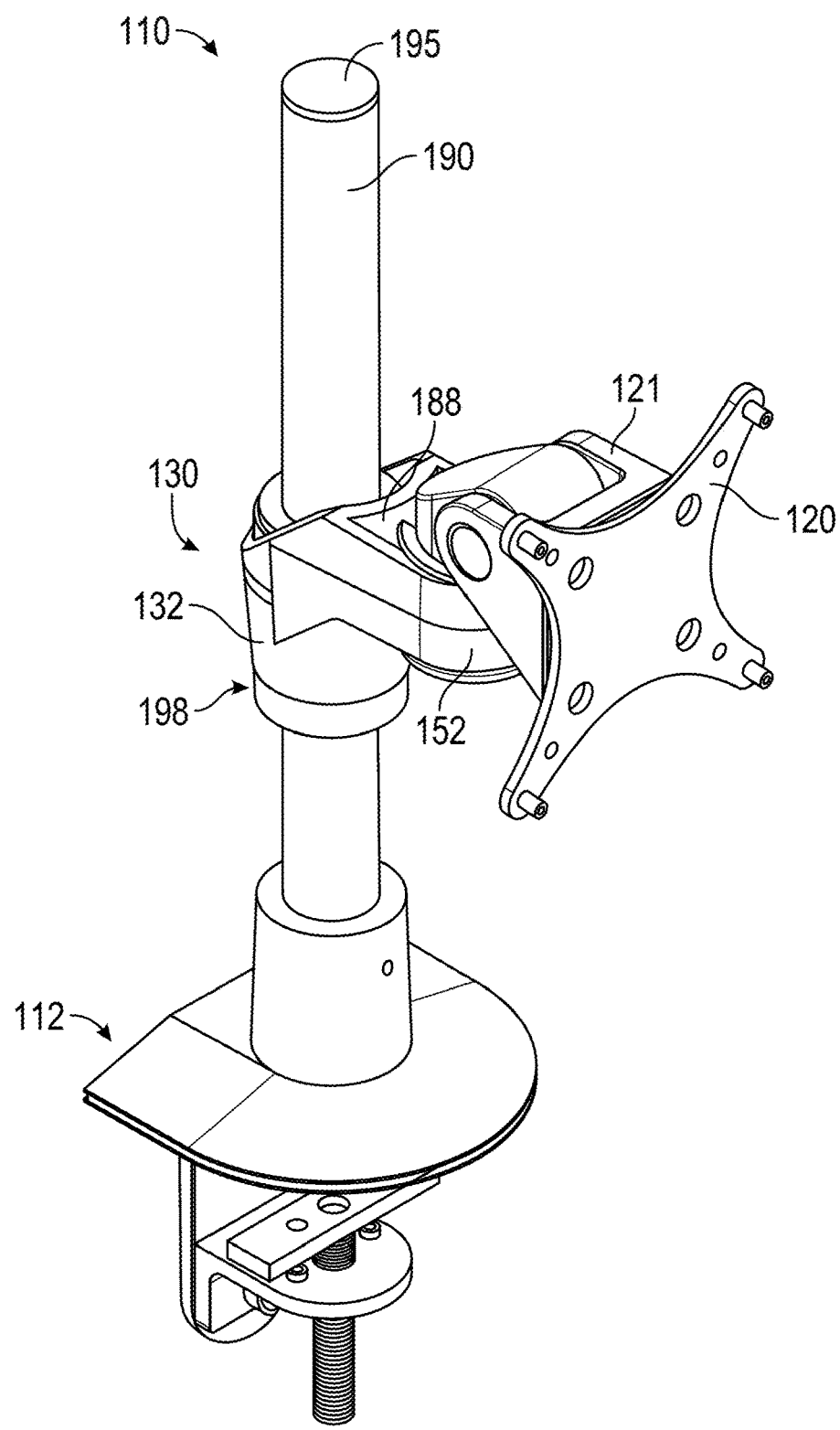
FIG. 12 is a front perspective view of a pole arm system in accordance with another embodiment of the present invention.

FIG. 12 shows a second embodiment of a pole arm system 110 in accordance with the present invention. In this embodiment, the pole arm system 110 comprises a base mount assembly 112, a pole 190 having a pole cap 195, a pole mount assembly 130 comprising a pole collar assembly 198, a tilter assembly 121, and a display adapter plate 120 connected to the tilter assembly 121. In this embodiment, the pole mount assembly 130 comprises a single pole mount cup 132 comprising a pole mount portion 136 and a shaft mount portion 152. The shaft mount portion 152, along with a pair of bushings (not labeled) having flanges, comprises a coupling 188 to which the shaft (not shown) of the tilter assembly 121 is rotationally attached. It should be understood that the pole arm system 110 of FIG. 12 is substantially identical to the pole arm system 10 of FIGS. 1-11, except for the omission of a second pole arm cup and the use of the coupling 188 to attach directly to the shaft of the tilter assembly 121—which is functionally identical to the shafts 27a,27b of the endcaps 26a,26b—rather than to an arm assembly (e.g., arm assemblies 18a,18b). The configuration of the pole arm system 110 shown in FIG. 12 shows the versatility of the present invention, in that the same parts (e.g., pole mount cup 132 and pole collar assembly 198, which are identical, respectively, to pole mount cup 32a and pole collar assembly 98 of pole arm system 10) can be used to create an entirely different configuration of the pole arm system 110.

Figure 13:
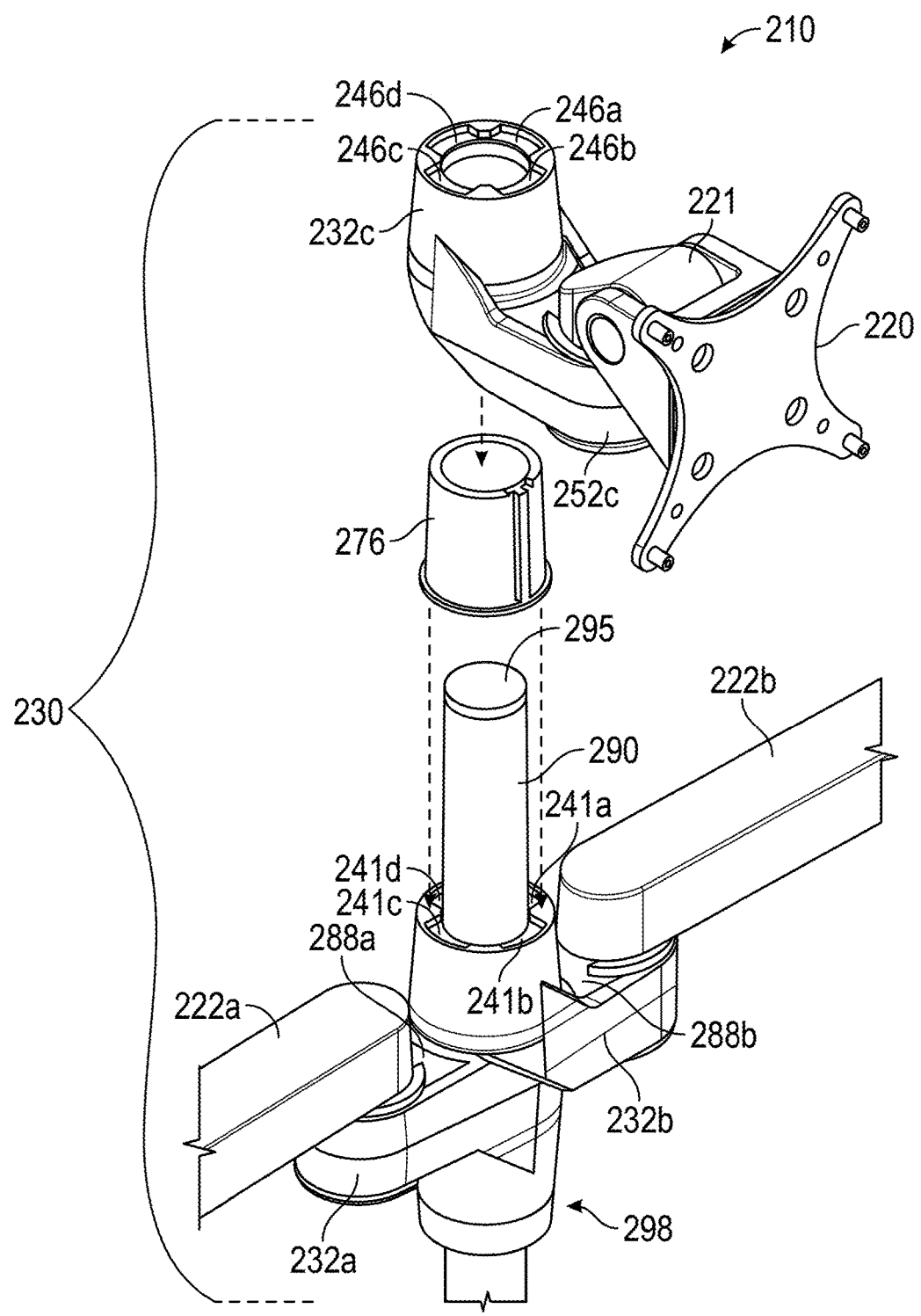
FIG. 13 is a front, partial exploded view of a pole arm system in accordance with yet another embodiment of the present invention.
Figure 14:
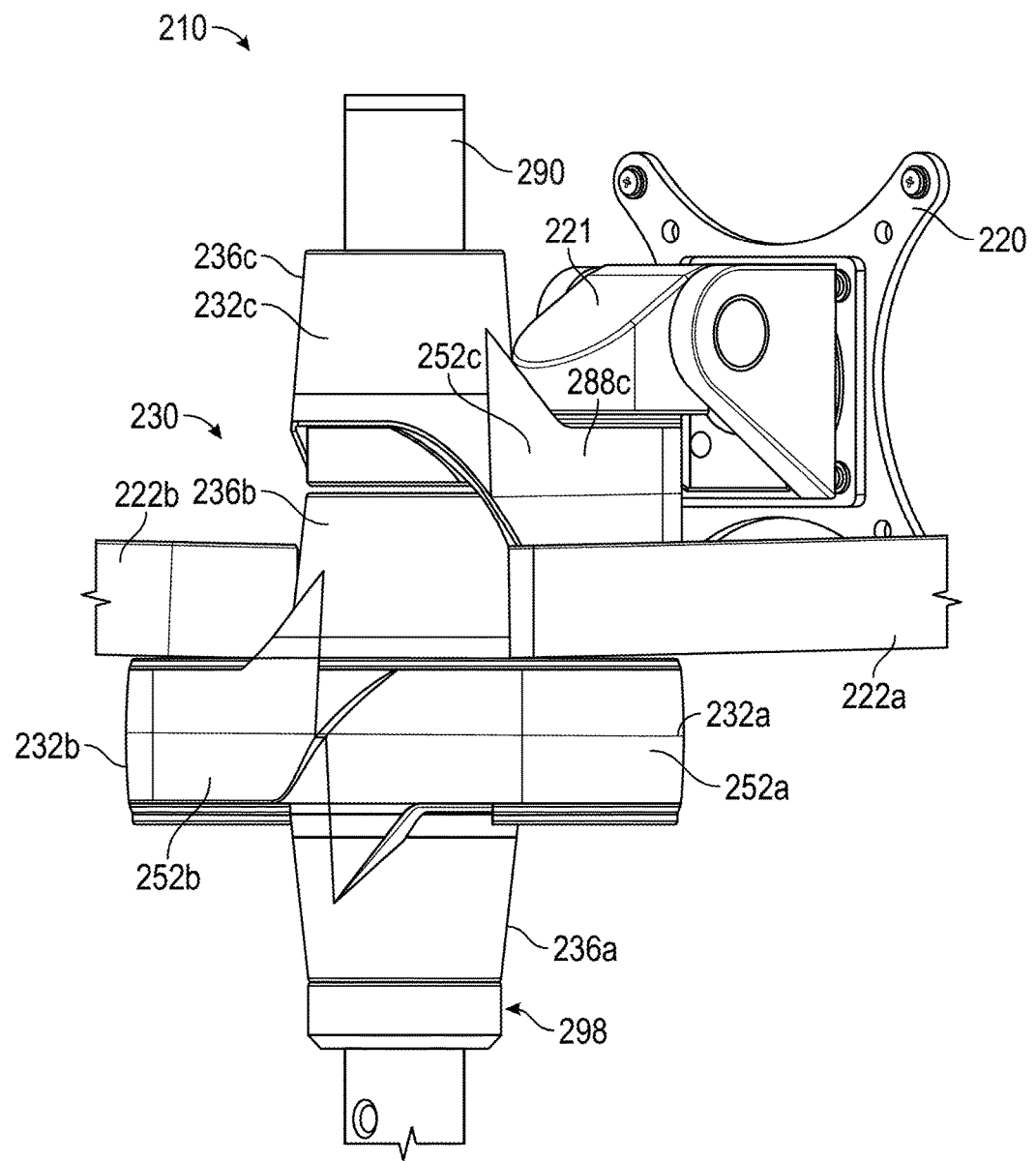
FIG. 14 is a rear perspective view of the assembled pole arm system of FIG. 13.

The versatility of the present invention is further illustrated by the additional embodiment of a pole arm system 210 shown in FIGS. 13 and 14, which uses identical components to the other embodiments of the pole arm system 10,110 discussed above. In this embodiment, the pole arm system 210 comprises a pole 290 having a pole cap 295, and a pole mount assembly 230 comprising three identical pole mount cups 232a-232c, which are likewise identical to the pole mount cups 32a,32b of the pole arm system 10 and pole mount cup 132 of the pole arm system 110. The pole mount cup 232a and pole mount cup 232b are mated together and installed atop a pole collar assembly 298 in an identical fashion to the pole arm system 10 shown in FIGS. 1-11. The pole mount cup 232a comprises a pole mount portion 236a and a shaft mount portion 252a, the pole mount cup 232b comprises a pole mount portion 236b and a shaft mount portion 252b, and the pole mount cup 232c comprises a pole mount portion 236c and a shaft mount portion 252c.

In this embodiment, the shaft mount portion 252a of pole mount cup 232a, along with a pair of bushings (not labeled) having flanges, comprise a coupling 288a into which the shaft (not shown) of a non-articulable forearm 222a has been installed in a like manner to the shafts 27a,27b of the endcaps 26a,26b of the pole arm system 10. Similarly, the shaft mount portion 252b of pole mount cup 232b, along with a pair of bushings (not labeled) having flanges, comprise a coupling 288b into which the shaft (not shown) of a non-articulable forearm 222b has been installed in a like manner to the shafts 27a,27b of the endcaps 26a,26b of the pole arm system 10. In addition, in this embodiment the shaft mount portion 252c of the pole mount cup 232c (along with a pair of bushings having flanges, not shown), once installed onto the pole 290, comprises a third coupling 288c into which the shaft (not shown) of a tilter assembly 221 is installed in a like manner to the shafts 27a,27b of the endcaps 26a,26b of the pole arm system 10. A display adapter plate 220, which is identical to the display adapter plates 20a,20b of the pole arm system 10, is attached to the tilter assembly 221 and is adapted for attachment of an electronic display thereto.

In this embodiment, a bushing 276—which is identical to the bushings 76a,76b of the pole arm system 10—is installed within the pole mount portion 236c of the pole mount cup 232c, and the tab (not labeled) of the bushing 276 engages with one of the slots 241a-241d (in this case slot 241b) located in the pole mount portion 236b of the pole mount cup 232b. In this way, the pole mount cup 232c is prevented from rotation with respect to the remainder of the pole mount assembly 230. Since the pole mount portion 236c of the pole mount cup 232c also comprises a plurality of slots 246a,246d, additional pole mount cups could be added to the length of the pole 290 on top of the pole mount cup 232c, thereby serving as additional couplings for the attachment of arms and/or tilters, subject to pole length and weight-supporting limitations related to the strength of the pole collar assembly 298.

In this embodiment, when mated together as shown in FIG. 14 with their respective pole mount portions 236a-236c installed around the pole 290, the pole mount cup 232a is in a vertically upright position and the pole mount cups 232b, 232c are in a vertically inverted position.

Figure 15:
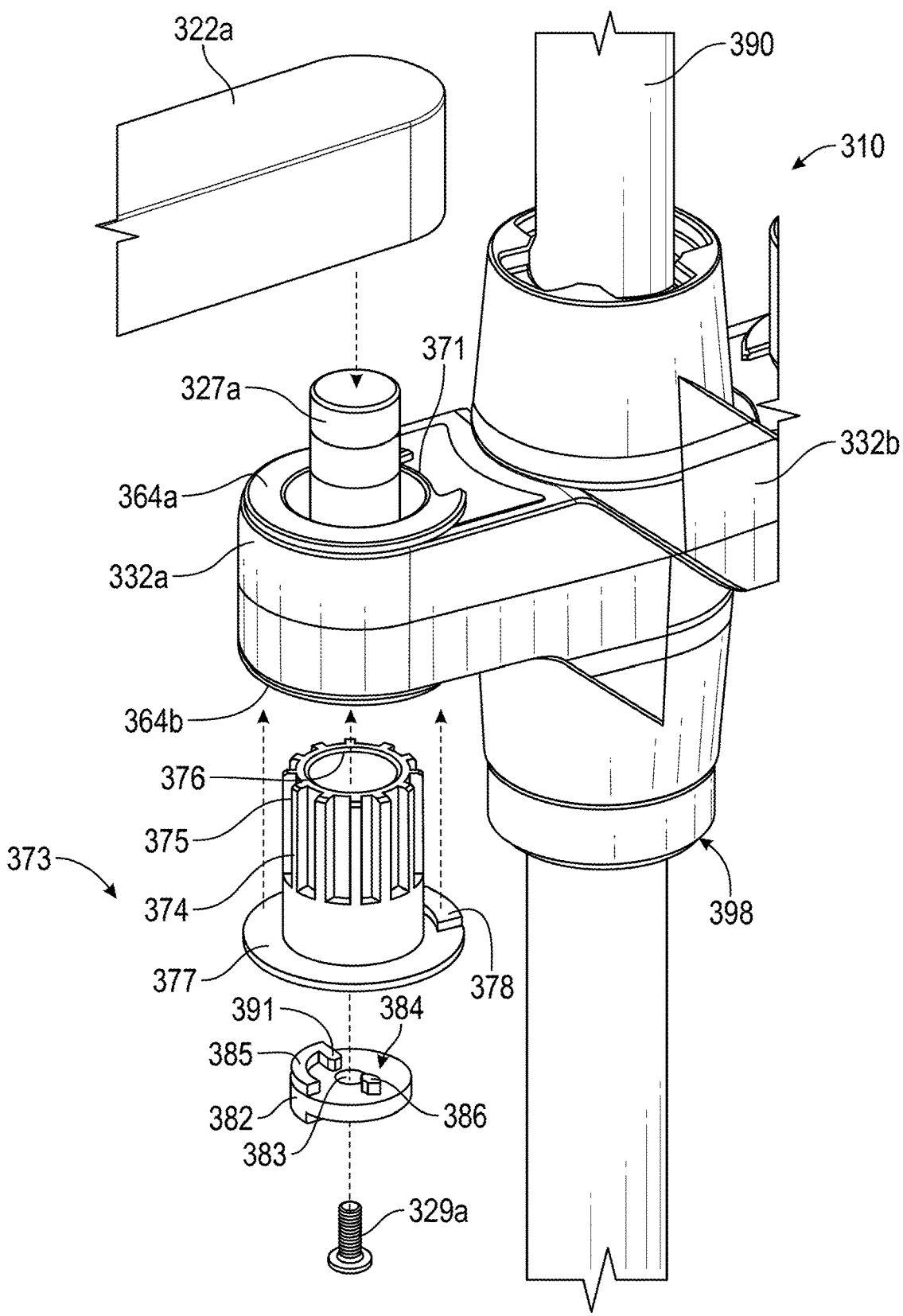
FIGS. 15-17 are views of an alternate joint mechanism with an invertible rotation stop component.
Figures 16, 17:
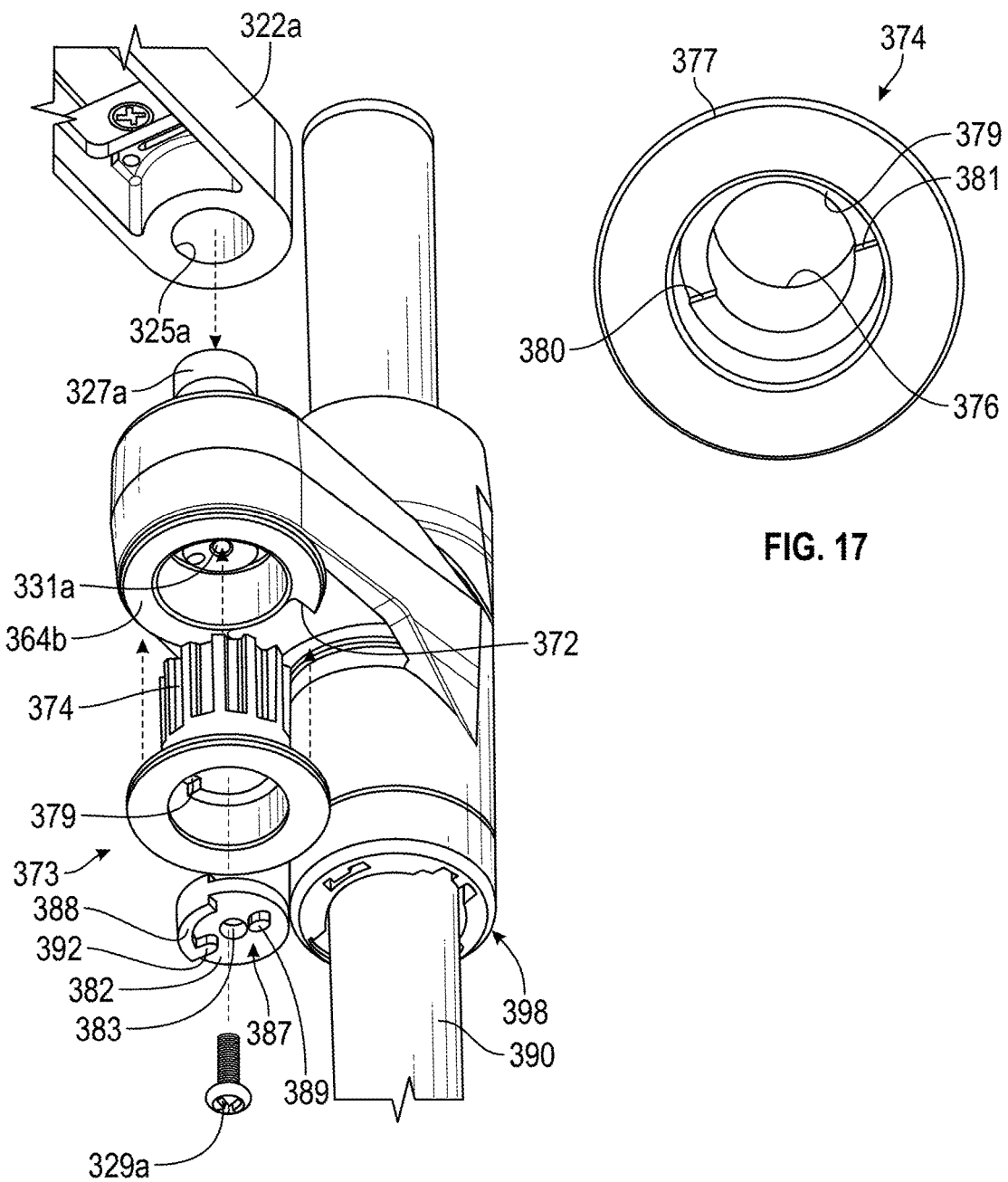

FIGS. 15-17 shows an alternate embodiment of a pole arm system 310 comprising a pair of pole mount cups 332a,332b (which are identical to the pole mount cups 32a,32b of FIGS. 1-14) that are mounted to a pole 390 (which is identical to pole 90 of FIGS. 1-14) via pole collar assembly 398 (which is identical to pole collar assembly 98 of FIGS. 1-14), and which further comprises an alternative joint mechanism including a rotation stop mechanism 373—which will be described in detail below—that limits the rotational range of an attached forearm 322a such that the entire arm assembly (i.e., the forearm 322a and any additional components attached distal thereto, for example any additional articulating or rigid arm members, tilters, or electronic devices) cannot rotate so far backwardly (with respect to a user sitting in front of the pole 390) that the arm assembly would extend past the rear edge of a typical desk or table. It should be understood that this joint mechanism is fully compatible with the embodiment of the pole arm system 10 described above in detail. It should also be understood that an identical rotation stop mechanism may typically—though need not—be used where an additional forearm attaches to pole mount cup 332b, with the rotation stop washer 382 thereof inverted (as will be described in further detail below).

In this embodiment, the rotational range of each joint mechanism is designed to permit 90 degrees of rotational freedom of the attached forearm (e.g., forearm 322a), such that a pair of forearms (including forearm 322a) attached to respective pole mount cups 332a,332b are moveable between a first position in which they are aligned (as viewed from above) (i.e., the maximum spacing relationship between the distal ends of the forearms) and a second position in which they are in close proximity and parallel (i.e., distal ends of the forearms brought nearest each other at the front side of the pole 390, each forearm now being 90 degrees from its first position). It should be understood that the embodiment taught herein could be modified to provide for a greater or lesser degree of rotational freedom as desired by the user or appropriate for the application, by making the necessary changes to the structure described below. It should also be understood that different joints within the pole arm system 310 could be provided with different values of rotational freedom. It should further be understood that—while commonly most beneficial when used at the proximal-most joints of an arm assembly—the rotation stop mechanism 373 taught herein could be used as part of any rotatable joint of the pole arm system 10 described above.

In this embodiment, the forearm 322a comprises a shaft 327a that is of smaller diameter than the diameter of the open portions of the flanged bushings 364a,364b (which are identical to flanged bushings 64a,64b) that fit within the pole mount cup 332a, for the purpose of material savings where a full-sized shaft is not necessary (e.g., where the attached arm—e.g. forearm 322a—is not an up-down articulating arm and therefore will not be subject to the same amount of shear stress). In this embodiment, an adapter bushing 374—which in this embodiment is made of a plastic material—is inserted within the flanged bushings 364a,364b from the underside of the joint to both fill the space between the shaft 327a and the flanged bushings 364a,364b and to act as a support for the rotation stop washer 382, as will be described below in detail.

FIGS. 15 and 16 show partial exploded views of the pole arm system 310 and the rotation stop mechanism 373 thereof, and FIG. 17 shows a perspective bottom view of the adapter bushing 374. The adapter bushing 374 comprises a body portion 375 and a flange 377 comprising an alignment tab 378, which engages with an alignment slot 372 of the flanged bushing 364b—in a manner identical to the structures described above—to prevent rotation of the adapter bushing 374 once the joint is fully assembled. The flanged bushing 364a—which is identical to the flanged bushing 364b—comprises an alignment slot 371, but this part is not utilized in the configuration shown in FIGS. 15 and 16. In this embodiment, the body portion 375 of the adapter bushing 374 comprises a plurality of external grooves for the purpose of materials savings, though it should be understood that these grooves are optional, could be omitted entirely in alternate embodiments, and do no effect the functionality of the adapter bushing 374. In this embodiment, the adapter bushing 374 further comprises a shaft passage 376 through which the shaft 327a is routed when the joint is fully assembled.

In this embodiment, the rotation stop mechanism 373 further comprises a rotation stop washer 382 that is invertible such that it can be flipped over for use in either a left hand-side joint or a right hand-side joint (i.e., to the left or right of the pole 390), as necessary. The washer 382 comprises a first side 384 having a rotation stop portion 385—which in this embodiment is arcuate and integral with a dog washer tab 391—and an additional dog washer tab 386. The washer 382 comprises a central fastener passage 383 through which a fastener 329a is routed such that it engages with a fastener hole 331a located in the bottom end of the shaft 327a to secure the joint together. The bottom end of the shaft 327a also includes a pair of dog washer slots (not labeled). In a first configuration of the washer 382, the dog washer tabs 386, 391 engage with the dog washer slots located in the bottom end of the shaft 327a to form a secure joint, as described above and in greater detail in PCT International Application Publication No. WO 2015/085243, the contents of which are incorporated herein by reference as if set forth in their entirety. When the dog washer tabs 386, 391 are fixed within respective dog washer slots and the fastener 329a secures the joint together, the rotation stop portion 385 is seated within a rotation stop cutout 379 located within the adapter bushing 374. The rotation stop cutout 379 is shown in FIG. 17, and comprises ends 380,381 against which ends (not labeled) of the rotation stop portion 385 will come into contact as the joint is rotated, thus limiting the rotational freedom of the joint accordingly.

As shown in FIG. 16, the rotation stop washer 382 also comprises a second side 387 having a rotation stop portion 388—which in this embodiment is arcuate and integral with a dog washer tab 392—and an additional dog washer tab 389. When the washer 382 is inverted into its second configuration, the dog washer tabs 389, 392 engage with the dog washer slots (not labeled) located in the bottom end of the shaft 327a to form a secure joint as previously described, and the rotation stop portion 388 is seated within the rotation stop cutout 379 such that the same degree of rotation freedom is provided as in the first configuration, but in the opposite rotational direction.

Figure 18:
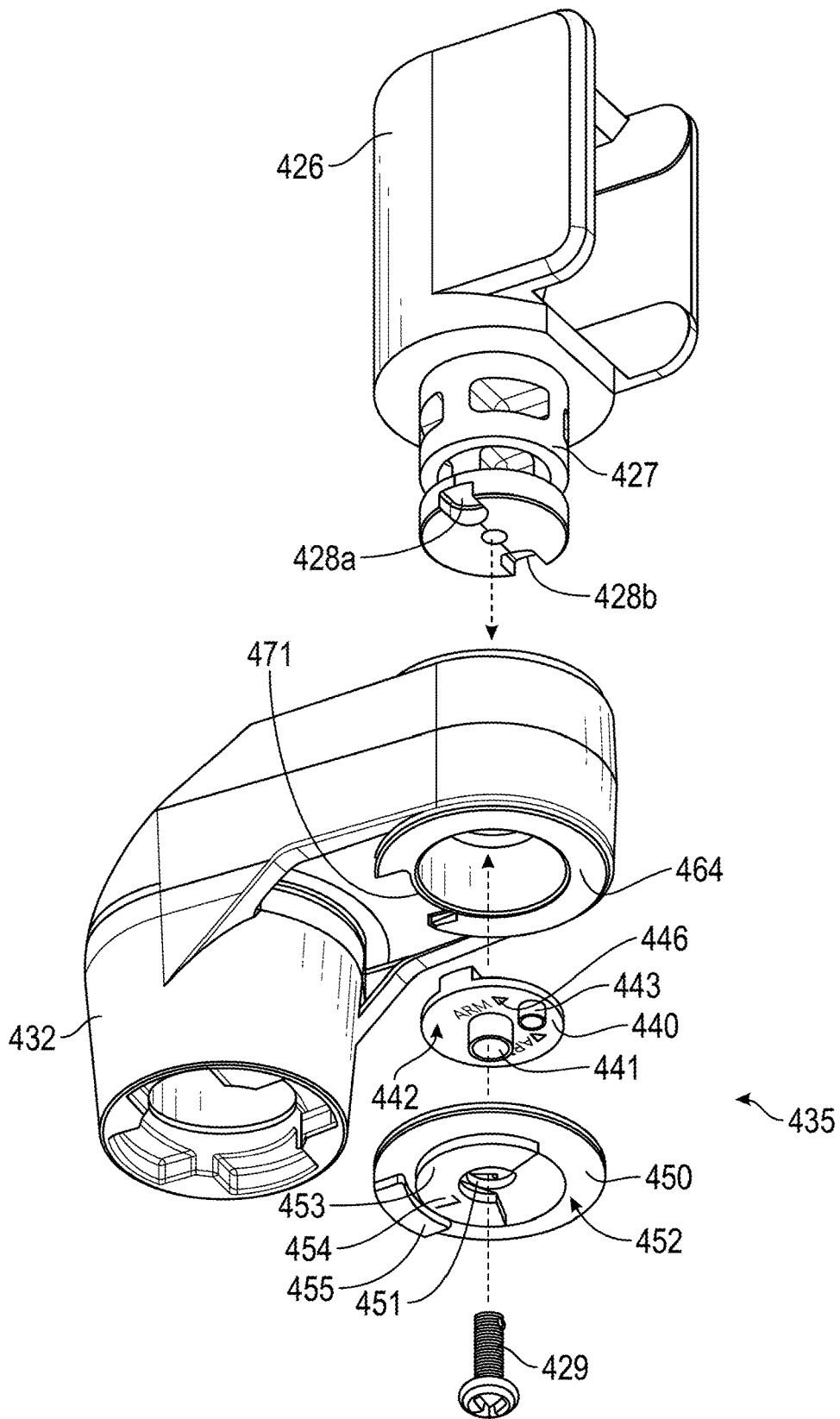
FIGS. 18 and 19 are views of an additional alternate joint mechanism with an invertible rotation stop component.
Figure 19:
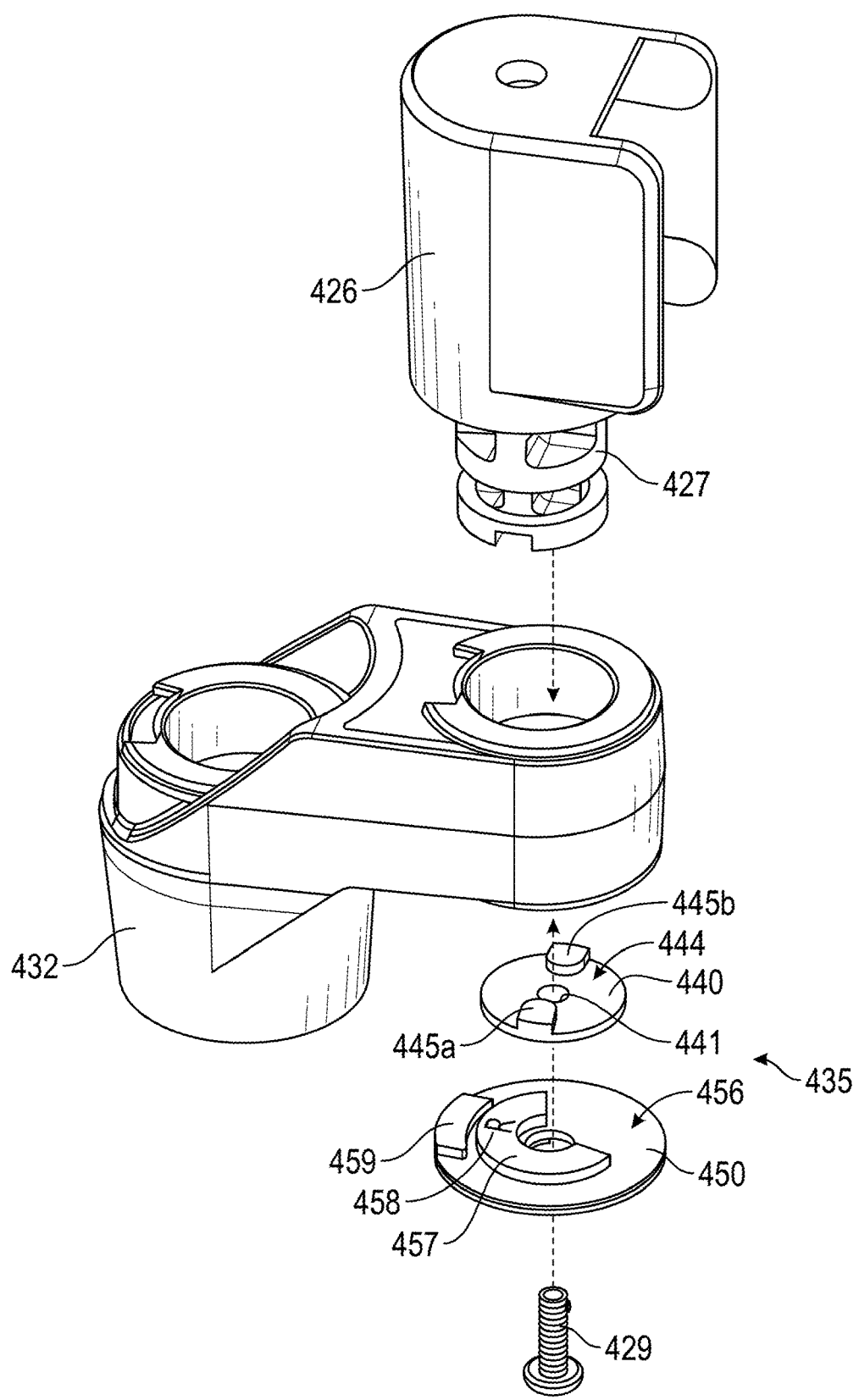

An additional alternate embodiment of a joint mechanism having a rotation stop mechanism 435 is shown in FIGS. 18 and 19. For ease of discussion, in this embodiment only a single pole mount cup 432—which is identical to pole mount cup 32a—is shown, though it should be understood that this rotation stop mechanism 435 could be employed with any embodiment or configuration of the invention taught herein as would be understood by a person having ordinary skill in the relevant art area. In this embodiment, the endcap 426 shown—which is identical to endcap 26a—comprises a shaft 427 of full thickness for use with an up-down articulating arm without the need for an adapter bushing in order it to fit within the flanged bushing 464—which is identical to flanged bushing 64b—of this embodiment. In this embodiment, the rotation stop mechanism 435—which will be described in detail below—limits the rotational range of the endcap 426 such that the entire arm assembly and any devices attached thereto are prevented from rotating to an undesired degree, as discussed above.

In this embodiment, the rotational range of the joint mechanism is designed to permit 90 degrees of rotational freedom of the attached endcap 426, such that any arm attached thereto is moveable between first and second positions as described above with respect to the embodiment of FIGS. 15-17. It should be understood that the embodiment of FIGS. 18 and 19 could be modified to provide for a greater or lesser degree of rotational freedom as desired by the user or appropriate for the application, by making the necessary changes to the structure described below. It should also be understood that different joints within any pole arm system taught herein could be provided with different values of rotational freedom. It should further be understood that— while commonly most beneficial when used at the proximal-most joints of an arm assembly—the rotation stop mechanism 435 taught herein could be used as part of any rotatable joint of any pole arm system taught herein.

In this embodiment, the shaft 427 of the endcap 426 comprises a pair of dog washer slots 428a,428b which engage with dog washer tabs 445a,445b of dog washer 440 in the same fashion as the embodiments described above, in order to form a secure joint that will not work loose over time. The dog washer 440 comprises a central fastener passage 441 for passage of a fastener 429 therethrough for fixation with the shaft 427 of the endcap 426, as discussed above in detail with respect to the other embodiments of this invention. In this embodiment, the dog washer 440 further comprises a first side 442 which includes a stud 443 and a second side 444 which includes the dog washer tabs 445a, 445b. The first side 442 of the dog washer 440 further comprises one or more direction marking 446 which indicates the front side of the dog washer 440 to ensure proper assembly of the rotation stop mechanism 435.

In this embodiment, the rotation stop mechanism 435 further comprises a rotation stop washer 450, which is invertible such that it can be flipped over for use in either a left hand-side joint or a right hand-side joint, as necessary. The washer 450 also contains a central fastener passage 451 through which the fastener 429 is routed when the joint is fully assembled. In this embodiment, the washer 450 comprises a first side 452 including a rotation stop portion 453 having a side marking 454 (in this embodiment the marking "L," indicating its use as part of a left-hand joint) and an alignment tab 455 which engages with an alignment slot 471 of the flanged bushing 464 to prevent rotation of the washer 450 with respect to the flanged bushing 464 when the joint is fully assembled. The washer 450 further comprises a second side 456 including a rotation stop portion 457 having a side marking 458 (in this embodiment the marking "R," indicating its use as part of a right-hand joint) and an alignment tab 459 which engages with the alignment slot 471 when this side of the washer 450 is being used.

Once the joint is fully assembled, the stud 443 on the dog washer 440 will come into contact with the ends (not labeled) of the respective one of the rotation stop portions 453,457 that is presently being employed as the endcap 426 is rotated, thus limiting the rotation freedom of the endcap 426 and any attached arm member.

While the principles of the invention have been described above in connection with preferred embodiments, it is to be clearly understood that this description is made only by way of example and not as a limitation of the scope of the invention.

The invention claimed is:

1. A pole arm system comprising:
a pole having a length;
a pole mount assembly comprising a first pole mount cup and a second pole mount cup, wherein the first pole mount cup and the second pole mount cup are identical, each of the pole mount cups comprising a pole mount portion and a shaft mount portion connected by a bend, the bend having a mating edge having a perimeter, the pole mount portion having a first axial passage adapted to surround the pole, the shaft mount portion having a second axial passage adapted to surround a shaft of an additional component of the pole arm system, the first axial passage having a first end and a second end, the second end terminating interior to the perimeter of the mating edge, wherein the bend locates the pole mount portion and the shaft mount portion at different vertical positions relative to the length of the pole when the pole mount portion is surrounding the pole; and
a pole collar assembly adapted to support the pole mount assembly at a user-selected location along the length of the pole;
wherein the first pole mount cup and the second pole mount cup are mated together by aligning the first axial passages of the first pole mount cup and the second pole mount cup around the pole and placing the mating edges of the first pole mount cup and the second pole mount cup adjacent to each other.

2. The pole arm system of claim 1, wherein the first pole mount cup is in a vertically upright position and the second pole mount cup is in a vertically inverted position when the first pole mount cup and second pole mount cup are mated together.

3. The pole arm system of claim 2, the pole mount assembly further comprising a third pole mount cup that is identical to the first pole mount cup and the second pole mount cup, the third pole mount cup comprising a pole mount portion and a shaft mount portion connected by a bend, the pole mount portion having a first axial passage adapted to surround the pole, the shaft mount portion having a second axial passage adapted to surround a shaft of an additional component of the pole arm system, wherein the third pole mount cup is installed onto the pole by aligning the first axial passage with the length of the pole with the third pole mount cup in a vertically inverted position and placing the third pole mount cup adjacent to the second pole mount cup, and wherein the bend locates the pole mount portion and the shaft mount portion at different vertical positions relative to the length of the pole when the pole mount portion is surrounding the pole.

4. The pole arm system of claim 1, wherein the additional component of the pole arm system is any of a non-articulable arm, an articulable arm, a tilter assembly, and a non-adjustable display adapter.

5. The pole arm system of claim 1, wherein the first axial passage and second axial passage of the first pole mount cup are parallel and the first axial passage and second axial passage of the second pole mount cup are parallel.

6. The pole arm system of claim 1, wherein the pole includes a plurality of dimples along its length, and the pole collar assembly includes a protrusion that interacts with a user-selected one of the plurality of dimples to support the pole mount assembly at the user-selected location along the length of the pole.

7. The pole arm system of claim 1, further comprising a first bushing located within the pole mount portion of the first pole mount cup in a non-rotatable configuration via the engagement of a first protrusion with a first slot and a second bushing located within the pole mount portion of the second pole mount cup in a non-rotatable configuration via the engagement of a second protrusion with a second slot, the first bushing and second bushing being in a non-rotatable configuration via the engagement of a third protrusion with a third slot.

8. The pole arm system of claim 1, further comprising at least one bushing located within the shaft mount portion of the first pole mount cup or second pole mount cup in a non-rotatable configuration via the engagement of a first protrusion with a first slot.

9. The pole arm system of claim 8, wherein the at least one bushing comprises an additional slot that is engageable with at least a portion of the additional component of the pole arm system to prevent rotation between the at least one bushing and the at least a portion of the additional component.

10. The pole arm system of claim 1, further comprising a rotation stop mechanism attached to the shaft of the additional component of the pole arm system within the second axial passage, the rotation stop mechanism configured to limit the rotational freedom of the shaft of the additional component within the second axial passage at least in part.

11. The pole arm system of claim 10, further comprising an adapter bushing located between the second axial passage and the shaft of the additional component, the adapter bushing comprising at least a portion of the rotation stop mechanism.

12. The pole arm system of claim 10, wherein the rotation stop mechanism comprises a rotation stop washer having a first rotation stop portion protruding from a first side thereof and a second rotation stop portion protruding from a second side thereof, the first side opposing the second side, wherein the limitation on the rotational freedom of the shaft of the additional component is different in a first configuration of the rotation stop washer in which the first rotation stop portion is utilized than it is in a second configuration of the rotation stop washer in which the second rotation stop portion is utilized.

13. The pole arm system of claim 12, wherein the limitations on the rotational freedom are different in that the additional component has rotational freedom in opposite rotational directions with respect to an axis of the length of the pole.

14. The pole arm system of claim 12, wherein the limitations on the rotational freedom are different in that the additional component has different quantities of rotational freedom.

* * * * *